US007318393B2

(12) United States Patent
Ayscue

(10) Patent No.: US 7,318,393 B2
(45) Date of Patent: Jan. 15, 2008

(54) LIGHTED PET HARNESS

(76) Inventor: Charles O. Ayscue, 6921 Vicksboro Rd., Henderson, NC (US) 27537-4521

( * ) Notice: Subject to any disclaimer, the term of this patent is extended or adjusted under 35 U.S.C. 154(b) by 0 days.

(21) Appl. No.: 11/418,276

(22) Filed: May 4, 2006

(65) Prior Publication Data
US 2007/0256646 A1 Nov. 8, 2007

(51) Int. Cl.
A01K 27/00 (2006.01)
(52) U.S. Cl. ..................................... 119/859
(58) Field of Classification Search ............... 119/859, 119/858, 720
See application file for complete search history.

(56) References Cited

U.S. PATENT DOCUMENTS

| 4,875,145 | A |   | 10/1989 | Roberts |  |
|---|---|---|---|---|---|
| 4,876,674 | A | * | 10/1989 | Parmely et al. | 119/859 |
| 5,046,456 | A |   | 9/1991 | Heyman et al. |  |
| 5,523,927 | A |   | 6/1996 | Gokey |  |
| 5,535,106 | A |   | 7/1996 | Tangen |  |
| 5,870,973 | A | * | 2/1999 | Touchton et al. | 119/721 |
| 6,055,942 | A |   | 5/2000 | Romanak et al. |  |
| 6,067,018 | A | * | 5/2000 | Skelton et al. | 340/573.3 |
| 6,202,599 | B1 | * | 3/2001 | Cutler | 119/859 |
| 6,574,498 | B1 |   | 6/2003 | Gilboa |  |
| 6,624,758 | B1 | * | 9/2003 | Omata et al. | 340/426.36 |
| 6,877,889 | B2 |   | 4/2005 | Peng et al. |  |
| 6,892,678 | B2 |   | 5/2005 | Cheng |  |
| 6,970,090 | B1 | * | 11/2005 | Sciarra | 340/573.1 |
| 7,140,327 | B2 | * | 11/2006 | Morehead | 119/859 |
| 2002/0011219 | A1 | * | 1/2002 | Chien | 119/859 |
| 2004/0000274 | A1 | * | 1/2004 | James | 119/859 |

FOREIGN PATENT DOCUMENTS

| DE | 3802861 A1 | * | 8/1989 |
| JP | 2005151889 A | * | 6/2005 |

* cited by examiner

Primary Examiner—Son T. Nguyen

(57) ABSTRACT

A pet collar or harness includes several series of light emitting diodes (LEDs). The series of lights are controlled by a remote, hand held unit. The lights can be set to flash, or some lights can be brighter than others, some lights can cascade while some lights pulse. A power source is located on the collar or harness and a power source is located in the remote control unit. One form of the pet collar or harness includes a light sensor operated circuit in the collar so the collar or harness is automatically activated when ambient light falls below a certain level. Another form of the pet collar or harness includes a motion detector circuit in the collar or harness so the collar or harness is activated only when the animal moves.

3 Claims, 1 Drawing Sheet

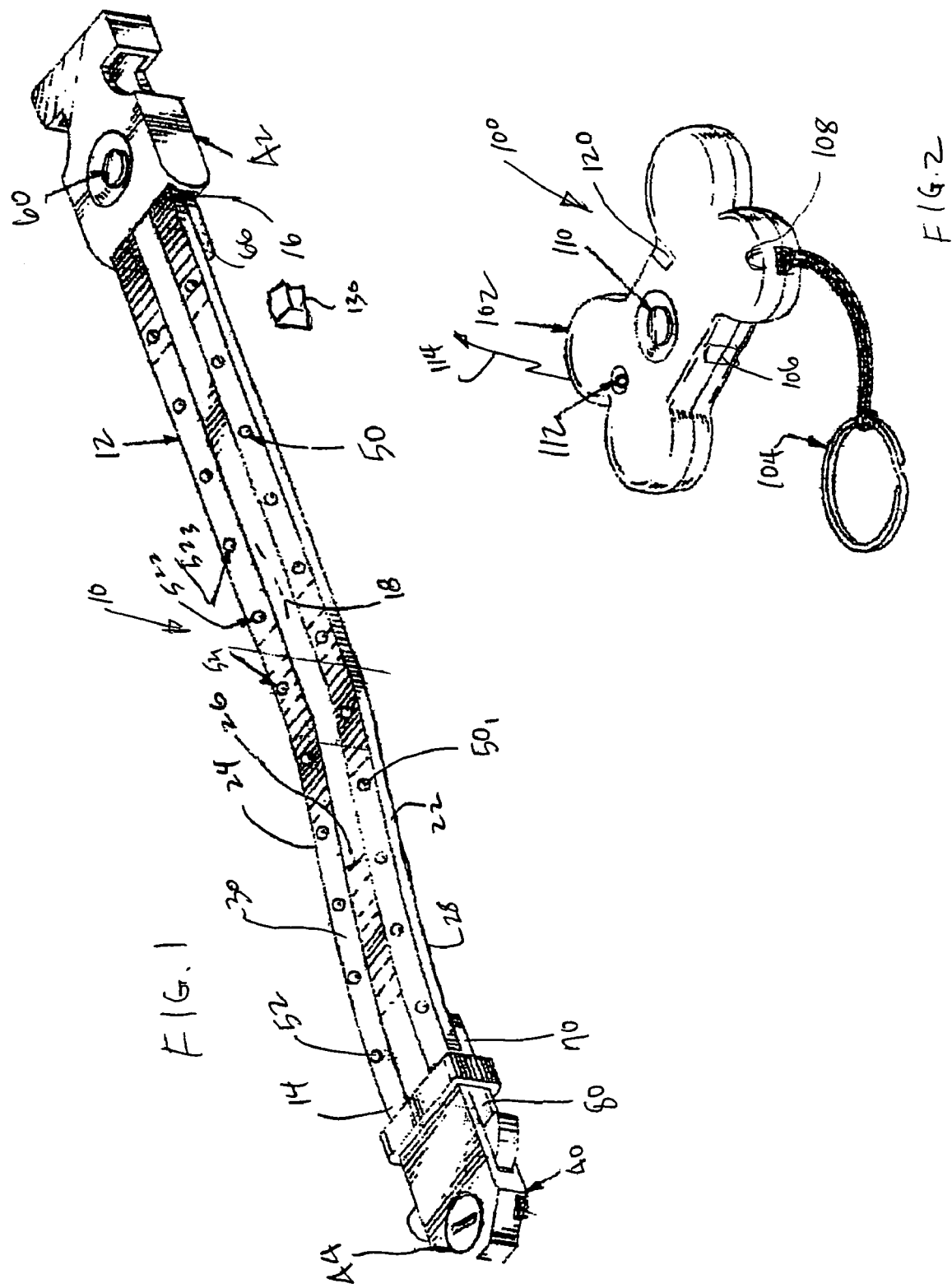

LIGHTED PET HARNESS

TECHNICAL FIELD OF THE INVENTION

The present invention relates to the general art of animals, and to the particular field of accessories for animals.

BACKGROUND OF THE INVENTION

The act of walking a dog is a pleasure enjoyed by many pet owners. The ability to get outside and experience nature and the surroundings is a simple joy. There are also the great health benefits associated with exercise for both the dog and the human walker. However, many pet owners have jobs which limit their walking time to night time hours, or many pet owners just enjoy walking at night. Accordingly, many people like to bring their pet along with them when walking or jogging, even at night or at dusk when ambient light is very low.

While the health benefits are the same, there is an increased danger from not being seen by motorists while walking at night. The reduced visibility which motorists experience while driving at night exposes pedestrians, bicyclists and animals to great danger of being struck by a vehicle. To increase visibility at night, most bicycles have reflectors on the wheels or frame which reflect the light from an automobile's headlights so that the driver of the automobile is able to see the bicycle. Various light reflective material has also been developed for use on clothing and shoes, providing greater visibility for pedestrians, such as joggers. In fact, most running and walking shoes and accessories are manufactured to include light reflective means.

More so than bicyclists and pedestrians, who stand considerably high above the ground, animals, such as dogs and cats, are extremely difficult to see at night. Further, unlike people who have a greater awareness of the danger of being struck by a car, animals can sometimes be erratic and confused and will often run in the path of oncoming cars. For instance, if dogs see other animals, they will usually give chase with such intent and focus that they block out their surroundings, running across streets with no regard for approaching cars. Thus, it is not surprising that a much greater number of animals are killed by vehicles than people.

While reflective clothing may help the owner, the pets being walked are still at risk. The risk increases greatly should the pet get away and run free. Additionally, there are some work dogs such as police dogs, rescue dogs and the like who work at night without the benefit of a nearby handler who would benefit from increased visibility. Therefore, while the pet owner is usually well equipped for night visibility, the animal is not so fortunate. The more attentive pet owner may provide the animal with a collar having light reflective material. However, a dog's or cat's hair will often cover much of the collar, minimizing the effectiveness of reflective material. Further, unless light (e.g. from headlights) shines directly on the light reflective material, the animal is not easily visible.

Reflective sweaters and straps are good indicators of the presence of the animal when the observer is in an automobile bearing down on the animal, assuming the automobile headlights are operating. Many situations exist where the animal and, thus, the observer do not have the benefit of direct and adequate light impinging upon the animal. Some people have attached small flashlights to pet collars, but such expedients are cumbersome and mostly inadequate for many situations such as, for example, protecting a pet wandering in the night from collision with a car, finding a lost or wandering pet and providing automatic attention-getting displays for pets and other animals in the night.

Furthermore, pets, such as dogs, typically need to be let outdoors in the evening or during the night. In areas where there is a substantial amount of shrubbery, owners can easily lose track of the pets. Oftentimes, merely calling a pet, such as a dog, is sufficient to have the pet returned to the owner or master. However, there are many occasions when a pet may disregard a call.

Attempts to locate pets under the above-described circumstances have sometimes been singularly unsuccessful. To solve the problem, resort has been made primarily to bells, or other sound emitting elements. However, in the dark, it is often difficult to identify specifically where the sound originates. Moreover, if a pet remains relatively immobile, a bell or the like will not sound.

Accordingly, there is a need in the pet industry for an animal collar which is highly and easily visible in the dark.

SUMMARY OF THE INVENTION

The above-discussed disadvantages of the prior art are overcome by a pet collar or harness that includes several series of light emitting diodes (LEDs). The series of lights are controlled by a remote, hand held unit. Thus, lights can be set to flash, or some lights can be brighter than others, some lights can cascade while some lights pulse. A power source is located on the collar and a power source is located in the remote control unit. A light sensor operated circuit can also be included in the collar or harness so the collar is automatically activated when ambient light falls below a certain level. A motion detector circuit can also be included so the collar or harness is activated whenever the animal moves.

Using the pet collar or harness embodying the present invention will permit a pet owner to activate the collar or harness from a remote location and also to control operation of the collar or harness. This will allow the pet owner to control the signal associated with the pet collar or harness whereby ambient light conditions as well as circumstances, such as a lost pet, a pet hiding in shrubbery, or the like, can be accounted for. The light sensor or motion sensor features will allow the collar or harness to be worn at all times while saving batteries because the collar or harness is only activated when necessary.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWING FIGURES

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 1 is a perspective view of a pet collar embodying the present invention.

FIG. 2 is a perspective view of a remote control included in the pet collar embodying the present invention.

DETAILED DESCRIPTION OF THE INVENTION

Referring to the figures, it can be understood that the present invention is embodied in a pet collar 10 embodying the present invention. It is noted that while the invention will be disclosed in connection with a collar, the invention will work on harnesses as well. Therefore, no limitation to a collar is intended by the disclosure of a collar and such disclosure is intended for convenience only.

Pet collar 10 comprises a flexible elongate body 12 which has a first end 14, a second end 16 and a longitudinal axis 18 which extends between first end 14 and second end 16. Body 12 further includes a first side edge 22, a second side edge 24 and a width axis 26 which extends between first side edge 22 and second side edge 24. Body 12 further includes a first surface 28 which is an inside surface when the body is in use and a second surface 30 which is an outside surface when body 12 is in use.

A first clasp element 40 is located on first end 14 of body 12 and a second clasp element 42 is located on second end 16 of body 12. First and second clasp elements 40 and 42 are releasably connected to each other when the body is in use. A replaceable battery 44 is located in the first clasp element. A series of first light elements 50 are located on the first surface of the body adjacent to the first side edge. The series of first light elements include a plurality of lights elements, such as light element 50, which are spaced apart from each other in the direction of longitudinal axis 18 and which extend from adjacent to first end 14 of the body to adjacent to second end 16 of the body.

A series of second light elements 52 are on the first surface of the body adjacent to second side edge 24. The series of second light elements includes a plurality of lights elements, such as light element $52_1$, $52_2$ and $52_3$, which are spaced apart from each other in the direction of longitudinal axis 18 and which extend from adjacent to the first end of the body to adjacent to the second end of the body.

An on/off switch 60 is located in second clasp element 42. In one form of the collar, a light sensor element 66 is located in the second clasp element. The light sensor may be used so that the collar is activated only in low ambient light conditions. This will save the batteries by activating the collar only during those times when visibility is low. A receiver element 70 is located in first clasp element 40.

A circuit 80 connects the light sensor element and the receiver element to the light elements via the on/off switch when the on/off switch is in an "on" configuration and when the light sensor element senses a light level below a preset level. Circuit 80 controls the light elements according to control signals received by the receiver element.

The overall pet collar 10 further comprises a transmitter unit 100 which is spaced apart from body 12 when the body and the transmitter unit are in use. Transmitter unit 100 includes a housing 102 and a key chain 104 can be connected to the housing. A battery 106 is located in the housing and an on/off switch 108 is located on the housing.

A multi-position control button 110 is located on the housing of the transmitter unit. The multi-position control button is movable between a flashing position, a cascade position, a steady illumination position, and a sequence position. A transmitter element 112 is located on housing 102. Transmitter element 112 is adapted to generate one control signal 114, of a plurality of different control signals when activated. Each control signal of the different control signals is associated with a particular position of the multi-position control button so that the lights 50 and 52 can be operated to flash, cascade, steadily illuminate or sequence as desired.

A control circuit 120 is located in housing 102 and connects battery 106 to transmitter element 112 via on/off switch 108 of the transmitter unit and via the multi-position control button 110 when the on/off switch of the transmitter unit is in an "on" configuration. The control circuit in the transmitter unit causes transmitter element 112 to generate one control signal of the different control signals when the on/off switch of the transmitter unit is in an "on" configuration and the multi-position control button is moved into a selected position.

Accordingly, operation of the lights on the flexible body is controlled according to control signals generated by the control circuit of the transmitter unit. While a light sensor has been disclosed, it is noted that one form of the collar can include a motion sensor 130 in place of the light sensor or in addition to the light sensor. The motion sensor will be activated only when the animal wearing collar 10 moves. This will save the batteries by activating the collar only when the animal moves. If the motion sensor is used in place of the light sensor, it will be located where light sensor 66 is shown in FIG. 1, if the motion sensor is used in conjunction with the light sensor, it will be located either on clasp 40 or adjacent to sensor 66.

It is noted that the details of the circuits included with pet collar 10 and the remote control associated therewith are known to those skilled in the art. The exact details of the circuits are not important to the present invention and will not be claimed. As such, these details will not be presented herein.

Use of collar 10 can be understood from the teaching of the foregoing disclosure and thus will be only briefly discussed. Body 12 is attached to an animal, such as a dog or a cat, and the motion sensor or the light sensor is activated and the receiver unit is also activated. A person carries transmitter unit 100 and selects the type of lighting desired by positioning the control button in one of its positions. The type of lighting can be selected according to ambient conditions or according to where the animal will be. The transmitter unit is then activated to send an appropriate control signal to the receiver of the flexible body on the animal and the lights are activated accordingly.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:
1. A pet collar comprising:
  A) a flexible elongate body having
    (1) a first end,
    (2) a second end,
    (3) a longitudinal axis which extends between the first end and the second end,
    (4) a first side edge,
    (5) a second side edge,
    (6) a width axis which extends between the first side edge and the second side edge,
    (7) a first surface which is an inside surface when the body is in use, and
    (8) a second surface which is an outside surface when the body is in use;
  B) a first clasp element on the first end of the body;

C) a second clasp element on the second end of the body, the first and second clasp elements being releasably connected to each other when the body is in use;
D) a battery in the first clasp element;
E) a series of first light elements on the first surface of the body adjacent to the first side edge, the series of first light elements including a plurality of lights elements which are spaced apart from each other in the direction of the longitudinal axis and which extend from adjacent to the first end of the body to adjacent to the second end of the body;
F) a series of second light elements on the first surface of the body adjacent to the second side edge, the series of second light elements including a plurality of lights elements which are spaced apart from each other in the direction of the longitudinal axis and which extend from adjacent to the first end of the body to adjacent to the second end of the body;
G) an on/off switch located in the second clasp element;
H) a light sensor element located in the second clasp element;
I) a receiver element located in the first clasp element;
J) a circuit connecting the light sensor element and the receiver element to the light elements via the on/off switch when the on/off switch is in an "on" configuration and when the light sensor element senses a light level below a preset level, the circuit controlling the light elements according to control signals received by the receiver element;
K) a transmitter unit which is spaced apart from the body when the body and the transmitter unit are in use, the transmitter unit including
  (1) a housing,
  (2) a key chain connected to the housing,
  (3) a battery in the housing,
  (4) an on/off switch on the housing,
  (5) a multi-position control button on the housing of the transmitter unit, the multi-position control button being movable between a flashing position, a cascade position, a steady illumination position, and a sequence position,
  (5) a transmitter element on the housing, the transmitter element being adapted to generate one control signal of a plurality of different control signals when activated, each control signal of the different control signals being associated with a particular position of the multi-position control button,
  (6) a control circuit in the housing which connects the battery to the transmitter element via the on/off switch of the transmitter unit and via the multi-position control button when the on/off switch of the transmitter unit is in an "on" configuration, the control circuit in the transmitter unit causing the transmitter element to generate one control signal of the different control signals when the on/off switch of the transmitter unit is in an "on" configuration and the multi-position control button is moved into a selected position; and
L) whereby operation of the lights on the flexible body are controlled according to control signals generated by the control circuit of the transmitter unit.

2. A pet collar comprising:
A) a flexible elongate body having
  (1) a first end,
  (2) a second end,
  (3) a longitudinal axis which extends between the first end and the second end,
  (4) a first side edge,
  (5) a second side edge,
  (6) a width axis which extends between the first side edge and the second side edge,
  (7) a first surface which is an inside surface when the body is in use, and
  (8) a second surface which is an outside surface when the body is in use;
B) a first clasp element on the first end of the body;
C) a second clasp element on the second end of the body, the first and second clasp elements being releasably connected to each other when the body is in use;
D) a battery in the first clasp element;
E) a series of first light elements on the first surface of the body adjacent to the first side edge, the series of first light elements including a plurality of lights elements which are spaced apart from each other in the direction of the longitudinal axis and which extend from adjacent to the first end of the body to adjacent to the second end of the body;
F) a series of second light elements on the first surface of the body adjacent to the second side edge, the series of second light elements including a plurality of lights elements which are spaced apart from each other in the direction of the longitudinal axis and which extend from adjacent to the first end of the body to adjacent to the second end of the body;
G) an on/off switch located in the second clasp element;
H) a motion sensor element located in the second clasp element;
I) a receiver element located in the first clasp element;
J) a circuit connecting the motion sensor element and the receiver element to the light elements via the on/off switch when the on/off switch is in an "on" configuration and when the motion sensor element senses motion above a preset level, the circuit controlling the light elements according to control signals received by the receiver element;
K) a transmitter unit which is spaced apart from the body when the body and the transmitter unit are in use, the transmitter unit including
  (1) a housing,
  (2) a key chain connected to the housing,
  (3) a battery in the housing,
  (4) an on/off switch on the housing,
  (5) a multi-position control button on the housing of the transmitter unit, the multi-position control button being movable between a flashing position, a cascade position, a steady illumination position, and a sequence position,
  (5) a transmitter element on the housing, the transmitter element being adapted to generate a plurality of different control signals when activated, each control signal of the different control signals being associated with a particular position of the multi-position control button,
  (6) a control circuit in the housing which connects the battery to the transmitter element via the on/off switch of the transmitter unit and via the multi-position control button when the on/off switch of the transmitter unit is in an "on" configuration, the control circuit in the transmitter unit causing the transmitter element to generate one control signal of the different control signals when the on/off switch of the transmitter unit is in an "on" configuration and the multi-position control button is moved into a selected position; and L) whereby operation of the lights on the flexible body are controlled according to control signals generated by the control circuit of the transmitter unit.

3. A pet collar consisting of:
A) a flexible elongate body;
B) a series of light elements on the body;
C) a receiver element located in the body;
D) a circuit connecting the receiver element to the light elements, the circuit controlling the light elements according to control signals received by the receiver element;
E) a transmitter unit which is spaced apart from the flexible body when the flexible body and the transmitter unit are in use, the transmitter unit including
  (1) a multi-position control button, the multi-position control button being movable between a plurality of different positions,
  (2) a transmitter element, the transmitter element being adapted to generate one control signal of a plurality of different control signals when activated, each control signal of the different control signals being associated with a particular position of the multi-position control button,
  (3) a control circuit which connects the transmitter element to the multi-position control button, the control circuit in the transmitter unit causing the transmitter element to generate one control signal of the plurality of different control signals when the control button is moved into a selected position; and
F) whereby operation of the lights on the flexible body are controlled according to control signals generated by the control circuit of the transmitter unit.

* * * * *